United States Patent [19]
Graves, Jr.

[11] Patent Number: 6,053,963
[45] Date of Patent: Apr. 25, 2000

[54] METHOD FOR TREATING ROTARY SLAG

[75] Inventor: Paul R. Graves, Jr., Phenix City, Ala.

[73] Assignee: GNB Technologies, Inc., Mendota Heights, Minn.

[21] Appl. No.: 09/082,930

[22] Filed: May 21, 1998

[51] Int. Cl.$^7$ .................................................. C22B 13/00
[52] U.S. Cl. .............................. 75/695; 65/19; 423/146; 423/199; 423/202
[58] Field of Search ................................ 65/19; 423/146, 423/199, 201, 202; 75/303, 695, 706

[56] References Cited

U.S. PATENT DOCUMENTS

| | | | |
|---|---|---|---|
| 1,754,207 | 4/1930 | Bradley et al. | 423/199 |
| 1,888,886 | 11/1932 | Fritchard | 423/199 |
| 1,938,672 | 12/1933 | Ruthruff | 208/230 |
| 3,653,822 | 4/1972 | Mita | 423/193 |
| 3,938,975 | 2/1976 | Nagata | 65/19 |
| 3,962,080 | 6/1976 | Dulin et al. | 588/236 |
| 4,034,063 | 7/1977 | Rosar et al. | 423/244 |
| 4,163,047 | 7/1979 | Dörr et al. | 423/531 |
| 4,252,563 | 2/1981 | Sundstrom | 75/695 |
| 4,452,762 | 6/1984 | Fugleberg et al. | 423/54 |
| 4,522,648 | 6/1985 | Kunicki et al. | 95/235 |
| 4,545,797 | 10/1985 | Elattar | 65/19 |
| 4,735,784 | 4/1988 | Davis et al. | 423/111 |
| 4,971,781 | 11/1990 | Meyer et al. | 423/532 |
| 5,496,392 | 3/1996 | Sims et al. | 75/414 |

OTHER PUBLICATIONS

Jecko, G. et al. Derwent Publication #1978–25729A. "Removal of Sulphur Oxide from Waste Gases—by Contact with Soda Slag from Metal Desulphurisation", Mar. 1978.

*Primary Examiner*—Prince Willis
*Assistant Examiner*—Tima McGuthry-Banks
*Attorney, Agent, or Firm*—Leydig, Voit & Mayer

[57] ABSTRACT

The present invention provides a method for treating rotary slag containing iron and sodium compounds. The method involves treating the slag in a sulfuric acid solution to convert the iron and sodium within the slag to iron sulfate and sodium sulfate. The iron sulfate (along with substantially all of the heavy metal contaminants) forms a precipitate, while the sodium sulfate remains in solution. The precipitate can then be separated from the solution.

26 Claims, 1 Drawing Sheet

6,053,963

METHOD FOR TREATING ROTARY SLAG

TECHNICAL FIELD OF THE INVENTION

The present invention relates to a method for treating rotary slag.

BACKGROUND OF THE INVENTION

Rotary furnaces are commonly employed during the smelting of lead. In such a furnace, a source of lead (e.g., free lead, lead cake, ore, etc.) is added to the rotary furnace along with soda ash, coke, and an iron flux material. Within the furnace, the lead is smelted, and the remainder of the ingredients are produced as slag. Such slag contains mostly iron and sodium compounds, especially oxides, hydroxides, and sulfides of iron and sodium. Rotary slag also often contains trace amounts of heavy metal contamination, especially lead, but also other heavy metals.

Currently, rotary slag is disposed of as industrial waste, generally in a landfill. Disposal of waste in landfills consumes ever dwindling landfill space and also requires considerable transportation costs. Moreover, landfilling rotary slag requires extensive treatment at the landfill site. For example, largely because of the heavy metals often present in rotary slag, it first must be fixed, typically by admixture with concrete and other additives. Such treatment requires considerable space and resources.

Aside from the expense and environmental threat associated with landfilling rotary slag, current industrial practice also presents other inefficiencies. Typically, iron flux material is supplied in the form of mill scale, which generally is purchased and added to the rotary furnace each time lead is smelted. Moreover, as mentioned, rather than being smelted, some of the lead is lost as waste in the rotary slag.

Thus, current lead smelting methods using a rotary furnace consume valuable resources and require considerable expense to avoid environmental pollution. In view of these problems, there exists a need for a method for treating rotary slag.

BRIEF SUMMARY OF THE INVENTION

The present invention provides a method for treating rotary slag. In its broadest sense, the method involves first treating the slag to convert iron and sodium within the slag to iron sulfate and sodium sulfate. The iron sulfate (along with substantially all of the heavy metal contaminants) forms a precipitate, while the sodium sulfate remains in solution. The precipitate can then be separated from the solution.

The sodium sulfate byproduct of the process can be used in a variety of applications. Moreover, the resulting iron sulfate material requires considerably less pretreatment prior to landfilling than raw rotary slag. Preferably, the resulting iron sulfate material can be reused as flux for the rotary furnace, lessening the requirement for fresh mill scale and reducing the amount of waste material sent to landfills. These and other advantages of the present invention, as well as additional inventive features, will be apparent from the accompanying drawing and in the following detailed description.

DETAILED DESCRIPTION OF THE INVENTION

Figure 1:
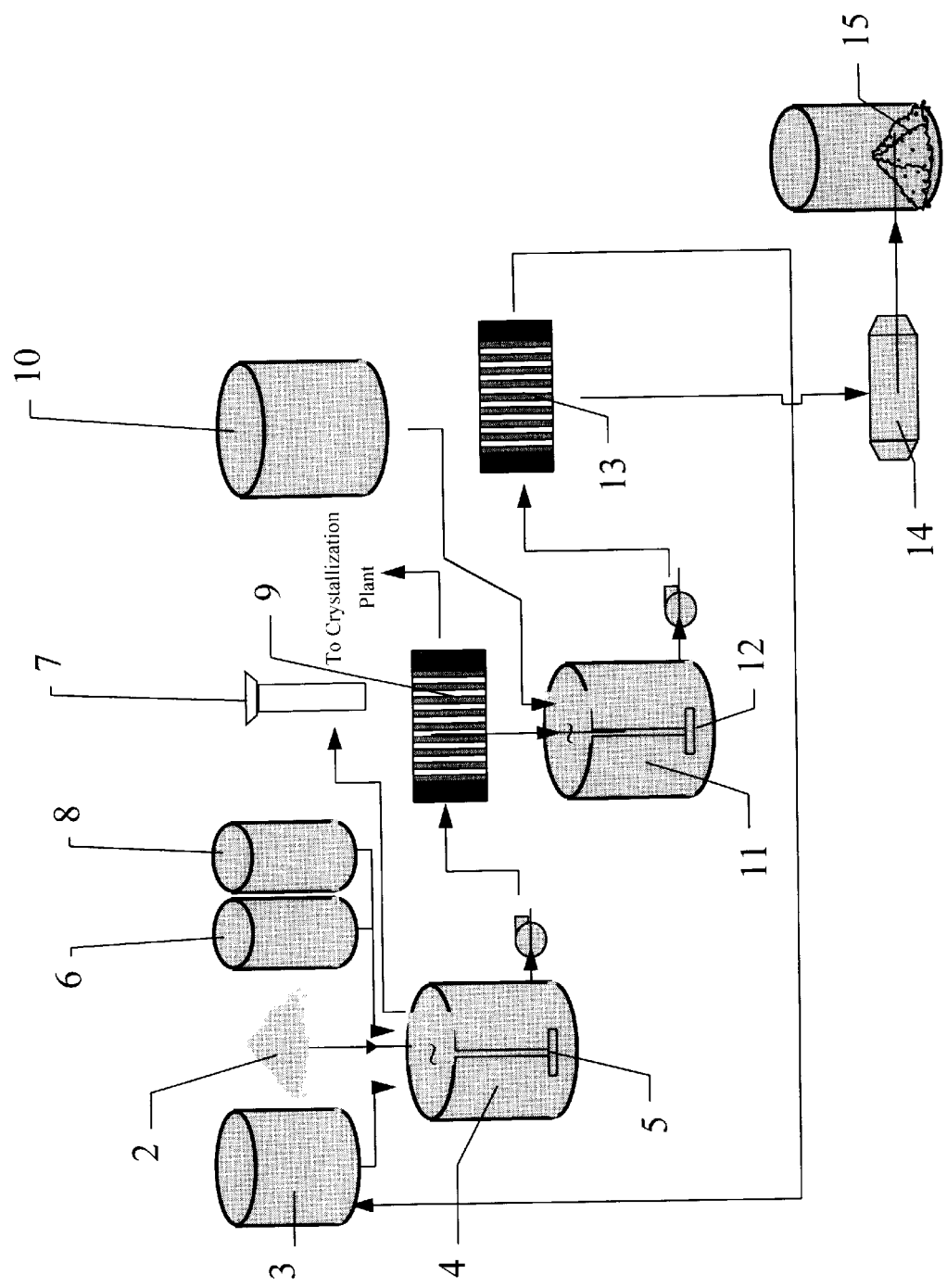
FIG. 1 is a flow diagram of the inventive method.

The time required for efficient employment of the inventive method depends, in part, on the surface area of the particles constituting the slag. Thus, in some protocols, it may be desirable to first increase the surface area of the slag, for example, by grinding, prior to exposure to the sulfuric acid. Generally, efficient conversion occurs when the slag particles are less than about 5 cm, although uniformity in size is not critical.

To control the conversion reaction, the slag particles are preferably exposed to a dilute aqueous solution (typically water), before exposure to the sulfuric acid. The amount of dilute aqueous solution added should be sufficient to form a slurry. Furthermore, the dilute aqueous solution preferably is added under constant agitation. For example, as indicated in FIG. 1, the slag 2 and dilute aqueous solution 3 can be added to a reaction tank 4 including a stirring means 5.

While in contact with the dilute aqueous solution, sodium oxide present in the slag will dissolve as hydroxides, thus increasing the pH. In turn, due to the slightly basic conditions, some iron oxide will also dissolve. These reactions are represented by the following equations:

$$2Na_2O + 2H_2O \rightarrow 4NaOH_{(aq)} \quad \text{(eq. 1)}$$

$$FeO + H_2O \rightarrow Fe(OH)_{2(aq)} \quad \text{(eq. 2)}$$

The next step of the inventive method involves converting iron and sodium to sulfates. Typically, this reaction is effected by exposing the slag to sulfuric acid, preferably a concentrated solution of sulfuric acid. In the presence of sulfuric acid, the sodium and iron hydroxides will undergo reactions represented by the following equations:

$$2NaOH_{(aq)} + H_2SO_4 \rightarrow Na_2SO_{4(aq)} + 2H_2O \quad \text{(eq. 3)}$$

$$Fe(OH)_{2(aq)} + H_2SO_4 \rightarrow FeSO_{4(aq)} + 2H_2O \quad \text{(eq. 4)}$$

Furthermore, the undissolved iron oxide and the sulfides present in the slag particles will react with the sulfuric acid to form sulfates via reactions represented by the following equations:

$$FeO + H_2SO_4 \rightarrow FeSO_{4(aq)} + H_2O \quad \text{(eq. 5)}$$

$$Na_2S + H_2SO_4 \rightarrow Na_2SO_{4(aq)} + H_2S_{(g)} \quad \text{(eq. 6)}$$

$$FeS + H_2SO_4 \rightarrow FeSO_{4(aq)} + H_2S_{(g)} \quad \text{(eq. 7)}$$

The amount of sulfuric acid and the time sufficient to effect the conversion can vary depending on the reaction conditions. However, typically, the reaction occurs when the pH is about 4 or less, and to effect a more complete conversion, preferably the pH is about 3 or less. Thus, the sulfuric acid solution is added to the slag to reduce the pH to the desired acidity and to maintain the effective pH until the desired endpoint. At a pH of about 3, if the solution is stirred or otherwise agitated, a reaction sufficient to effect the conversion requires at least about 10 minutes (more typically at least about 20 minutes). Thus, most preferably, the pH is maintained at about 3 or less for at least about 30 minutes, under conditions of constant agitation. The sulfuric acid solution can be added in any suitable manner. As indicated in FIG. 1, the sulfuric acid is stored in a reservoir 6 connected to the reaction tank 5 in such a manner so as to facilitate addition of the sulfuric acid to the slurry.

As indicated by equations 6 and 7, hydrogen sulfide gas is produced during the acid treatment step. For safety concerns, it is desirable in many protocols to vent this gas, for example though a chimney or other ventilation device. To minimize adverse environmental effect of released hydrogen sulfide, this gas can be passed though a scrubber (indicated schematically as 7 in FIG. 1), such as those known in the art.

As indicated by equations 4, 5, and 7, the products of the reaction of the rotary slag with the sulfuric acid include soluble iron sulfates. Thus, the inventive method next involves a step for precipitating $FeSO_4$. Typically, this is accomplished by adding a precipitating agent to the acidic solution. Preferably, the precipitating agent is NaOH because it is readily available and does not result in the precipitation of appreciable amounts of sodium sulfate; however, other compounds (e.g., $H_2O_2$) can be similarly employed. The precipitating agent can be added in any suitable manner. As indicated in FIG. 1, a NaOH solution is stored in a reservoir 8 connected to the reaction tank 4 in such a manner so as to facilitate addition of the NaOH to the slurry.

The precipitating agent as added to the acidic solution in an amount and for a time sufficient to precipitate the $FeSO_4$. While the amount necessary to precipitate $FeSO_4$ will vary, where NaOH is employed as the precipitating agent, typically the amount of NaOH required will raise the pH of the slurry to about 8 or higher. At a pH of at least about 8, if the solution is stirred or otherwise agitated, the precipitation of $FeSO_4$ requires at least about 10 minutes (more typically at least about 20 minutes). Thus, most preferably, to effect precipitation, the pH is maintained at about 8 or higher for at least about 30 minutes, under conditions of constant agitation.

After the $FeSO_4$ has been precipitated, the inventive method involves a step for separating the precipitate from the sodium sulfate solution. Any suitable method can be employed (e.g., paper filtration, membrane filtration, vacuum filtration, etc.), the most suitable will largely depend on the scale of operation. As depicted in FIG. 1, for industrial scale applications, the solution is separated from the precipitate using a filter press 9.

Following separation from the sodium sulfate solution, the wet precipitate can be further processed, for example by landfilling or stored for reuse as described below. However, following filtration, the wet precipitate will contain some amount of sodium and typically some dilute amount of sulfuric acid. As the precipitate dries, the pH will drop and the presence of the sulfuric acid will prompt some of the $FeSO_4$ to convert to $Fe_2(SO_4)_3$, which increases the amount of sulfate in the precipitate. Thus, preferably, the precipitate is rinsed with a dilute aqueous solution (typically water) in an amount and for a time sufficient to substantially reduce the presence of these contaminants. The precipitate is rinsed by any suitable method (e.g., spraying, resuspending, repulping, etc.). For example, as indicated in FIG. 1, the precipitate and dilute aqueous solution 10 can be added to a repulp tank 11 including a stirring means 12.

Following rinsing, the precipitate is separated from the dilute aqueous solution. Any suitable method can be employed (e.g., paper filtration, membrane filtration, vacuum filtration, etc.), the most suitable will largely depend on the scale of operation. As depicted in FIG. 1, for industrial scale applications, the dilute aqueous solution is separated from the precipitate using a second filter press 13, similar to the filter press 9 referred to above.

Preferably, following rinsing and the second filtration, the sodium concentration of the precipitate is less than about 10% by weight, more preferably less than about 5% by weight. Moreover, the concentration of residual sulfuric acid in the precipitate is negligible. At this stage of the inventive method, the precipitate is dried, preferably by heating (e.g., in an oven, indicated as 14 in FIG. 1). The resulting precipitate consists essentially of $Fe_3O_4$, such that the iron content of the precipitate is at least about 15% by weight, more preferably the iron content of the precipitate is at least about 20% by weight. Typically, the precipitate will also contain heavy metal contaminants present in the original rotary slag. Such a precipitate is substantially free of sodium and can be processed more readily than untreated slag.

Aside from producing a treated iron product of the smelting process that is more readily processed or landfilled than raw slag, the inventive method confers additional benefits. For example, instead of landfilling the iron sulfate precipitate produced by the inventive method, it can instead be stored (indicated in FIG. 1 at 15) and recycled as iron flux for the rotary furnace. This reuse of iron conserves landfill space and minimizes the need for purchasing fresh mill scale as flux. Only after several rounds of such reuse will the iron waste need to be discarded due to concentration of the heavy metals.

Another advantage of the inventive method is that the sodium sulfate can be crystallized from the supernatant separated from the initial precipitate by methods known in the art. Such recovered sodium sulfate can then be used, for example, in the food industry.

Another advantage of the inventive method is that it conserves water. For example, the water recovered from the crystallization process for recovering sodium sulfate or removed from the second filter press can be used as a dilute aqueous solution in the inventive method, for example, in forming the initial slurry or in the repulping step.

The following examples further illustrate the present invention. As these examples are included for purely illustrative purposes, they should not be construed to limit the scope of the present invention in any respect.

EXAMPLE 1

This example demonstrates that treating rotary slag with sulfuric acid reduces the content of sodium therein.

500 ml $H_2O$ was placed in a beaker and slurried with 50 grams ground rotary slag for 5 minutes. Concentrated $H_2SO_4$ was then added to the slurry, and $H_2S$ gas was evolved. $H_2SO_4$ continued to be added to the slurry until no further reaction was observed, and the pH measured less than 1.0. After 5 minutes, 10 N NaOH was added until all reaction stopped, and the pH measured 10.21. The beaker was then slurried for 5 minutes. Following this protocol, the solution was vacuum filtered using a buchner funnel and #40 filter paper.

The filter was then placed in an oven to dry overnight, and the filtrate stored for analysis. The amount of elements present in the filtrate and the precipitate are indicated in Table 1.

EXAMPLE 2

This example demonstrates that repulping the filtrate reduces the amount of sodium retained in the precipitate.

3000 ml $H_2O$ was placed in a beaker connected to a motorized stirring apparatus and an automatic pH meter. 300 g ground rotary slag was gradually added to the water. After 10 minutes of agitation, the pH was measured as 12.76. 111 ml concentrated $H_2SO_4$ was then added to the slurry until the pH reached 3.00. After 10 minutes, the pH was measured again at 4.00. Subsequently, 121 ml 10 N NaOH was added until the pH measured 8.50 and was stirred for 30 minutes. Following this protocol, the solution was vacuum filtered using a buchner funnel and #40 filter paper.

The filter was then placed in an oven to dry overnight, and the filtrate stored for analysis. After the filtrate had dried, it was observed to have a yellow/brown coloration consistent with the presence of $Fe_2(SO_4)_3$. The filter cake was slurried in 2000 ml $H_2O$ for 10 minutes and then filtered as previously described and dried. The filtrate had grown large white crystals after overnight storage. The amount of elements present in the initial filtrate and the repulped precipitate are indicated in Table 1.

minutes and then filtered as previously described and dried. The filter cake and three aliquots of the filtrate were assayed for the concentration of various elements. The amount of elements present in the initial filtrate and the repulped precipitate are indicated in Table 1.

TABLE 1

| | Example 1 | | Example 2 | | Example 3 | | | | Example 4 | | | |
| --- | --- | --- | --- | --- | --- | --- | --- | --- | --- | --- | --- | --- |
| Element | Pre-cipitate | Filtrate | Pre-cipitate | Filtrate | Pre-cipitate | Filtrate 1 | Filtrate 2 | Filtrate 3 | Precipitate | Filtrate 1 | Filtrate 2 | Filtrate 3 |
| Se | | 1.2 ppm | | .08 ppm | | 0.4 ppm | 0.2 ppm | 0.1 ppm | | 0.3 ppm | <0.1 ppm | <0.1 ppm |
| As | 3.00% | 16.8 ppm | | 33.1 ppm | | 6.5 ppm | 9.9 ppm | 15.1 ppm | | 39.8 ppm | 102.0 ppm | 90.6 ppm |
| S | | | 18.20% | | | | | | | | | |
| Sb | 1.90% | 5.7 ppm | 0.32% | .08 ppm | 0.33% | <0.1 ppm | <0.1 ppm | <0.1 ppm | 0.29% | 2.7 ppm | 10.3 ppm | 9.0 ppm |
| Pb | 1.70% | <1 ppm | 3.86% | 1.4 ppm | 2.63% | 17.5 ppm | 6.7 ppm | 14.0 ppm | 2.83% | 5.0 ppm | 0.9 ppm | 15.6 ppm |
| Sn | 1.40% | | 1.91% | | 2.14% | | | | 2.07% | | | |
| Fe | 3.90% | | 16.90% | 1.5 ppm | 23.30% | 17.3 ppm | 14.1 ppm | 14.4 ppm | 22.90% | | | |
| Na | 17.20% | 16,500 ppm | 3.30% | | 5.80% | | | | 7.30% | | | | present in the initial filtrate and the repulped precipitate are indicated in Table 1.

EXAMPLE 3

This example demonstrates that repulping the precipitate before it has dried reduces the amount of sulfur in the precipitate.

3000 ml $H_2O$ was placed in a beaker connected to a motorized stirring apparatus and an automatic pH meter. 300 g ground rotary slag was gradually added to the water. After 10 minutes of agitation, 127 ml concentrated $H_2SO_4$ was then added to the slurry until the pH reached 4.00. After 10 minutes, 153 ml 10 N NaOH was added until the pH measured 8.32. The mixture was stirred for 30 minutes, after which the pH dropped to 8.05. Following this protocol, the solution was vacuum filtered using a buchner funnel and #40 filter paper.

The filter cake was the repulped by slurrying it in 2000 ml $H_2O$ for 10 minutes and then filtered as previously described and dried. The cake was observed to have a brown exterior and a dark green interior, suggesting that repulping prior to drying removes $H_2SO_4$, preventing the conversion of the iron to $Fe_2(SO_4)_3$. The filter cake and three aliquots of the filtrate were assayed for the concentration of various elements. The amount of elements present in the initial filtrate and the repulped precipitate are indicated in Table 1.

EXAMPLE 4

This example demonstrates that a more complete conversion occurs when the pH of the reaction is below 3.

3000 ml $H_2O$ was placed in a beaker connected to a motorized stirring apparatus and an automatic pH meter. 300 g ground rotary slag was gradually added to the water. After 15 minutes of agitation, 100 ml $H_2SO_4$ was added to the slurry until the pH reached 3.00. After 15 minutes, the pH had risen to 5.0, and 9 ml additional $H_2SO_4$ was added to the slurry over 14 minutes to bring the pH to 3.0. Over 15 minutes, the pH slowly rose to 4.0. Over 8 minutes, 129 ml 10 N NaOH was added until the pH measured 9.02. The mixture was stirred for 30 minutes, after which the pH dropped to 8.67.

Following this protocol, the solution was vacuum filtered using a buchner funnel and #40 filter paper. The filter cake was the repulped by slurrying it in 2000 ml $H_2O$ for 10 minutes and then filtered as previously described and dried.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A method for treating rotary slag containing sodium and iron, said method comprising exposing said slag to a dilute aqueous solution to form a slurry, and exposing said slurry to sulfuric acid in an amount and for a time sufficient to convert said iron to $FeSO_4$ and said sodium to $Na_2SO_4$.

2. The method of claim 1, wherein said sodium in said slag is present as one or more compounds selected from the group consisting of $Na_2O$, NaOH, and $Na_2S$.

3. The method of claim 1, wherein said iron in said slag is present one or more compound selected from the group consisting of FeO, $Fe(OH)_2$, and FeS.

4. The method of claim 1, wherein said slag is first ground to form a gravel.

5. The method of claim 1, wherein, upon contact with said sulfuric acid, said slurry has a pH of about 4 or less.

6. The method of claim 1, wherein upon contact with said sulfuric acid, said slurry has a pH of about 3 or less.

7. The method of claim 1, further comprising adding NaOH to said slurry in an amount sufficient to precipitate said $FeSO_4$.

8. The method of claim 7, wherein said NaOH is added to said slurry in an amount sufficient to raise the pH of said slurry to about 8.

9. The method of claim 7, further comprising separating said slurry into said precipitate and a supernatant.

10. The method of claim 9, wherein said supernatant comprises $Na_2SO_4$, which is thereafter recovered from said supernatant.

11. The method of claim 9, further comprising washing said precipitate with a dilute aqueous solution.

12. The method of claim 11, wherein said dilute aqueous solution is water.

13. The method of claim 11, further comprising separating said precipitate from said dilute aqueous solution.

14. The method of claim 13, further comprising drying said precipitate.

15. The method of claim 14, wherein said precipitate is subsequently used as flux in a rotary furnace.

16. The method of claim 14, wherein said precipitate is landfilled.

17. The method of claim 1, wherein said slag further comprises a heavy metal.

18. The method of claim 17, wherein said heavy metal is selected from the group consisting of antimony, arsenic, lead, nickel, selenium, and tin.

19. A method for treating rotary slag containing sodium and iron, said method comprising:

a first step for converting said iron to $FeSO_4$ and said sodium to $Na_2SO_4$, a second step for precipitating said $FeSO_4$, and a third step for removing said $FeSO_4$.

20. The method of claim 19, wherein said first step comprises exposing said slag to a dilute aqueous solution to form a slurry, and exposing said slurry to sulfuric acid in an amount and for a time sufficient to convert said iron to $FeSO_4$ and said sodium to $Na_2SO_4$.

21. The method of claim 20, wherein said second step comprises adding NaOH to said slurry in an amount sufficient to precipitate said $FeSO_4$.

22. The method of claim 19, further comprising a fourth step for washing said $FeSO_4$.

23. A method for reusing rotary slag, said method comprising:

a first step for converting said iron to $FeSO_4$ and said sodium to $Na_2SO_4$, a second step for precipitating said $FeSO_4$, a third step for removing said $FeSO_4$, a fourth step for drying said precipitated $FeSO_4$, and adding said dried $FeSO_4$ as flux to a rotary furnace.

24. The method of claim 23, wherein said first step comprises first exposing said slag to a dilute aqueous solution to form a slurry, exposing said slurry to sulfuric acid in an amount and for a time sufficient to convert said iron to $FeSO_4$ and said sodium to $Na_2SO_4$ or NaOH.

25. The method of claim 24, wherein said second step comprises adding NaOH to said slurry in an amount sufficient to precipitate said $FeSO_4$.

26. The method of claim 23, further comprising a step for washing said precipitated $FeSO_4$ before said fourth step.

* * * * *

UNITED STATES PATENT AND TRADEMARK OFFICE
CERTIFICATE OF CORRECTION

PATENT NO. : 6,053,963
DATED : April 25, 2000
INVENTOR(S) : Graves, Jr.

It is certified that error appears in the above-indentified patent and that said Letters Patent is hereby corrected as shown below:

IN THE CLAIMS

In Claim 23, Column 8, Line 3: "slag," should read --slag containing sodium and iron,--.

Signed and Sealed this

Twenty-seventh Day of March, 2001

*Attest:*

NICHOLAS P. GODICI

*Attesting Officer*    Acting Director of the United States Patent and Trademark Office